US008477860B2

(12) United States Patent
Kamuf et al.

(10) Patent No.: US 8,477,860 B2
(45) Date of Patent: Jul. 2, 2013

(54) OFDM SIGNAL RECEPTION IN THE PRESENCE OF INTERFERENCE

(75) Inventors: Matthias Kamuf, Lund (SE); Bengt Lindoff, Bjärred (SE); Sven Mattisson, Bjärred (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 298 days.

(21) Appl. No.: 12/869,816

(22) Filed: Aug. 27, 2010

(65) Prior Publication Data

US 2012/0051464 A1    Mar. 1, 2012

(51) Int. Cl.
*H04L 27/01*    (2006.01)

(52) U.S. Cl.
USPC ........................................... 375/260

(58) Field of Classification Search
USPC .......... 370/252, 311, 329, 338, 466; 375/260, 375/316, 340, 346; 455/63.1, 226.1, 226.2, 455/295
See application file for complete search history.

(56) References Cited

U.S. PATENT DOCUMENTS

| | | | |
|---|---|---|---|
| 2002/0080728 A1 | 6/2002 | Sugar et al. | |
| 2007/0064839 A1* | 3/2007 | Luu | 375/340 |
| 2007/0213013 A1* | 9/2007 | Kim | 455/69 |
| 2008/0039045 A1 | 2/2008 | Filipovic et al. | |
| 2008/0118012 A1* | 5/2008 | Corke et al. | 375/348 |
| 2009/0325509 A1 | 12/2009 | Mattisson et al. | |
| 2010/0067627 A1 | 3/2010 | Lincoln et al. | |

FOREIGN PATENT DOCUMENTS

| | | |
|---|---|---|
| GB | 2 451 682 A | 2/2009 |
| WO | 2009/106929 A1 | 9/2009 |
| WO | 2009/156510 A2 | 12/2009 |

OTHER PUBLICATIONS

Motorola, "RX IP2 performance", 3GPP TSG-RAN Working Group 4, Meeting #50, San Francisco, CA, US, May 4-8, 2009, Report R4-091800.
Ericsson, "Reference sensitivity and IIP2", 3GPP TSG-RAN Working Group 4 (Radio), Meeting #51, San Francisco, CA, US, May 4-8, 2009, Report R4-091970.
PCT International Search Report, mailed Nov. 7, 2011, in connection with International Application No. PCT/EP2011/063937.

* cited by examiner

*Primary Examiner* — Sam K Ahn
*Assistant Examiner* — Shawkat M Ali
(74) *Attorney, Agent, or Firm* — Potomac Patent Group PLLC

(57) ABSTRACT

Decoding a received Orthogonal Frequency Division Multiplex (OFDM) signal that occupies a first set of subcarriers in a radio frequency spectrum includes ascertaining an interference model that represents interference occurring in the first set of subcarriers caused by a transmitted OFDM signal that occupies a second set of subcarriers in the radio frequency spectrum. A set of scaled soft values is produced that represents information conveyed by the received OFDM signal over the first set of subcarriers, wherein each scaled soft value in the set of scaled soft values corresponds to a respective one of the subcarriers in the first set of subcarriers, and wherein a scaling amount applied to each of the scaled soft values is based on a corresponding level of interference in said respective one of the subcarriers as indicated by the interference model. A decoding process is performed that generates detected data from the scaled soft values.

22 Claims, 12 Drawing Sheets

OFDM SIGNAL RECEPTION IN THE PRESENCE OF INTERFERENCE

BACKGROUND

The present invention relates to cellular communication systems, more particularly to communication systems that employ Orthogonal Frequency Division Multiplexing (OFDM), and even more particularly to the reception of an OFDM signal in the presence of interference.

Cellular communication systems are well-known and are in wide-spread use around the world. FIG. 1 is a diagram illustrating a common feature found in most systems: a serving node 101 (depending on the system, it can be called a "base station", a Node B, an evolved Node B ("eNodeB" or "eNB")) serves user equipment (UE) 103 that is located within the serving node's geographical area of service, called a "cell" 105. For convenience, the term eNB will be used henceforth throughout this document, but any such references are not intended to limit the scope of the invention to only those particular systems that use this particular terminology. Thus, references to "eNB" are intended to also refer to "base stations", "Node B's", and "eNodeB's" and also to any equivalent node in a cellular communication system.

Communication is bidirectional between the eNB 101 and the UE 103. Communications from the eNB 101 to the UE 103 are referred to as taking place in a "downlink" direction, whereas communications from the UE 103 to the eNB 101 are referred to as taking place in an "uplink" direction.

To achieve bidirectional communications, a number of different strategies can be employed. For example, uplink and downlink transmissions can be scheduled to take place at different times in a so-called time division duplex (TDD) mode of operation so that they never occur at the same time. TDD operation permits, but does not require, the same frequencies to be used for both downlink and uplink transmissions.

An alternative strategy, called frequency division duplex (FDD) involves allocating different frequencies for downlink transmissions than are allocated for uplink transmissions. This permits, but does not require, downlink and uplink transmissions to occur simultaneously.

Because of the freedom afforded by FDD operation, many such systems schedule downlink and uplink data transmissions independently of one another, so that sometimes only downlink transmission is taking place, sometimes only uplink transmission is taking place, and sometimes both downlink and uplink transmission are taking place at the same time.

Aspects of a typical diversity receiver 200 for such a system (e.g., a Long Term Evolution—"LTE"—UE receiver) are depicted in FIG. 2. Although such a UE is said to use one transmitter and two receivers, Release 8 of the LTE standards permits a UE architecture to have only two physical antennas, and this will likely be the case for many practical embodiments. For two antenna architectures, the transmitter (TX) and one receiver (RX) branch share one of the same antenna 201 as shown in the figure. The receiver branch that shares the antenna with the transmitter branch includes a low noise amplifier (LNA) 203 for boosting the power of the received signal. The transmitter branch includes a power amplifier 205 for boosting the power of the signal to be transmitted. A so-called duplex filter 207 is then used to suppress leaking of the TX signal into the RX branch to a certain extent. (The illustrated amount of suppression is denoted $a_{tx-rx}$ in FIG. 2, with the receiver part of the duplex filter 203 suppressing by an amount $a_{rx}$.) For example, the minimum requirements on the receiver's reference sensitivity (REFSENS) are defined in RAN4, see 3GPP TS 36.101, which basically verify the noise factor of the receiver.

In systems such as the LTE mobile communication system described above, there is a disturbance leakage between the uplink and downlink chains when the UE is scheduled to perform both uplink and downlink transmissions in the same subframe. This is due to second order inter-modulation products (IM2) in which unwanted TX signal leakage into the receive branch results in noise components around the demodulated DC sub-carrier. As shown in FIG. 3, the IM2 noise spectrum 301 is symmetric around DC and has a bandwidth that is approximately twice as large as the bandwidth of the uplink transmission. This leakage essentially increases the noise floor for the affected sub-carriers. This in turn can degrade the overall downlink demodulation performance as illustrated in FIG. 4, which shows the effect of degrading one third of the allocated sub-carriers of an exemplary system. The signal-to-noise ratio (SNR) of the sub-carriers experiencing the interference is varied between the curves.

In principle, the problem with IM2 products in the receiver can be solved by increasing the second-order intercept point (IP2) of the receiver (i.e., solved by imposing higher linearity requirements in the low noise amplifier and mixer components). However, achieving that linearity means increased cost and current consumption. Nonetheless, the sensitivity performance is an important measure of performance for a UE because it is related to coverage and is therefore an important aspect not only from a practical point of view, but also as a marketing tool. Hence linearity in the radio components is a trade-off between cost and performance.

There are also other IM products that can degrade the receiver performance close to the reference sensitivity level. For example, interference from third-order intermodulation (IM3) products originates when third order non-linearities cause the TX signals to mix with a strong blocking signal transmitted at a location in the radiofrequency spectrum that is substantially half the duplex distance between the transmitted and received signals.

In the above discussion, IM2 and IM3 are mentioned specifically. However, as is well known by those of ordinary skill in the art, higher order even and odd nonlinearities, respectively, will give rise to similar effects. Thus, for the sake of simplicity but without loss of generality, only IM2 and IM3 are mentioned here.

There is therefore a need for methods and apparatuses for improving receiver performance close to the reference sensitivity level when receiver impairments such as those discussed above are present.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses, and processor readable storage media for decoding a received Orthogonal Frequency Division Multiplex (OFDM) signal that occupies a first set of subcarriers in a radio frequency spectrum. Decoding includes ascertaining an interference model that represents interference occurring in the first set of subcarriers caused by a transmitted OFDM signal that occupies a second set of subcarriers in the radio frequency spectrum. A set of scaled soft values is produced that represents information conveyed by the received OFDM signal over the first set of subcarriers, wherein each scaled soft value in the set of scaled soft values corresponds to a respective one of the subcarriers in the first set of subcarriers, and wherein a scaling amount applied to each of the scaled soft values is based on a corresponding level of interference in said respective one of the subcarriers as indicated by the interference model. A decoding process is performed that generates detected data from the scaled soft values.

In an aspect of some embodiments, ascertaining the interference model comprises determining a reception power level of the received OFDM signal and determining a transmission power level of the transmitted OFDM signal, wherein the interference model applies non-uniform scaling if the reception power level of the received OFDM signal is below a first threshold value and the transmission power level of the transmitted OFDM signal is above a second threshold value.

In an aspect of some embodiments, the interference model applies uniform scaling if the reception power level of the received OFDM signal is not below the first threshold value and/or the transmission power level of the transmitted OFDM signal is not above the second threshold value.

In an aspect of some embodiments, ascertaining the interference model comprises ascertaining a bandwidth of the second set of subcarriers and ascertaining the interference model at least in part as a function of the ascertained bandwidth of the second set of subcarriers.

In an aspect of some embodiments, the interference model specifies non-minimal interference levels occurring on those subcarriers within the first set of subcarriers that are no farther than the ascertained bandwidth's distance from a center subcarrier of the first set of subcarriers, and the interference model specifies minimal interference levels occurring on those subcarriers within the first set of subcarriers that are farther than the ascertained bandwidth's distance from the center subcarrier of the first set of subcarriers.

In an aspect of some embodiments, the interference model specifies a maximum interference level occurring at the center subcarrier of the first set of subcarriers and diminishing levels of interference occurring in correspondence with distance from the center subcarrier of the first set of subcarriers.

In an aspect of some embodiments, ascertaining the interference model comprises ascertaining the interference model at least in part as a function of a duplex distance between the first set of subcarriers and the second set of subcarriers.

In an aspect of some embodiments, the received OFDM signal and the transmitted OFDM signal are separated from one another by a duplex distance in the radio frequency spectrum, and decoding comprises, ascertaining a hypothesized interference model that would apply to the first set of subcarriers for each of a set of one or more hypothesized signals being transmitted in the radio frequency spectrum at a location that is substantially one half the duplex distance away from the received OFDM signal, wherein each of the hypothesized signals, when mixed with the transmitted OFDM signal that occupies the second set of subcarriers, gives rise to IM3 products located within one or more of the first set of subcarriers; and ascertaining which one of the hypothesized interference models most closely matches measured results, and using the ascertained one of the hypothesized interference models to at least in part determine a level of scaling applied to each of the soft values.

In an aspect of some embodiments, ascertaining the hypothesized interference model that would apply to the first set of subcarriers comprises retrieving the hypothesized interference model from a lookup table.

In an aspect of some embodiments, ascertaining which one of the hypothesized interference models most closely matches measured results comprises obtaining symbols from the received OFDM signal that are usable as reference symbols; using the obtained symbols that are usable as reference symbols in a channel estimation procedure that generates residual values; using the residual values to obtain a validation results for each of the hypothesized interference models; and ascertaining which one of the hypothesized interference models is associated with a highest level of validation.

In an aspect of some embodiments, the received OFDM signal and the transmitted OFDM signal are separated from one another by a duplex distance in the radio frequency spectrum, and ascertaining the interference model comprises ascertaining the interference model at least in part as a function of the duplex distance and of non-linear characteristics of a power amplifier that supplies the transmitted OFDM signal.

In an aspect of some embodiments, the received OFDM signal and the transmitted OFDM signal are separated from one another by a duplex distance in the radio frequency spectrum, and ascertaining the interference model comprises ascertaining the interference model at least in part as a function of the duplex distance and of non-linear characteristics of a low noise amplifier and or mixer in a receiver that receives the received OFDM signal.

BRIEF DESCRIPTION OF THE DRAWINGS

The objects and advantages of the invention will be understood by reading the following detailed description in conjunction with the drawings in which.

DETAILED DESCRIPTION

Figure 1:
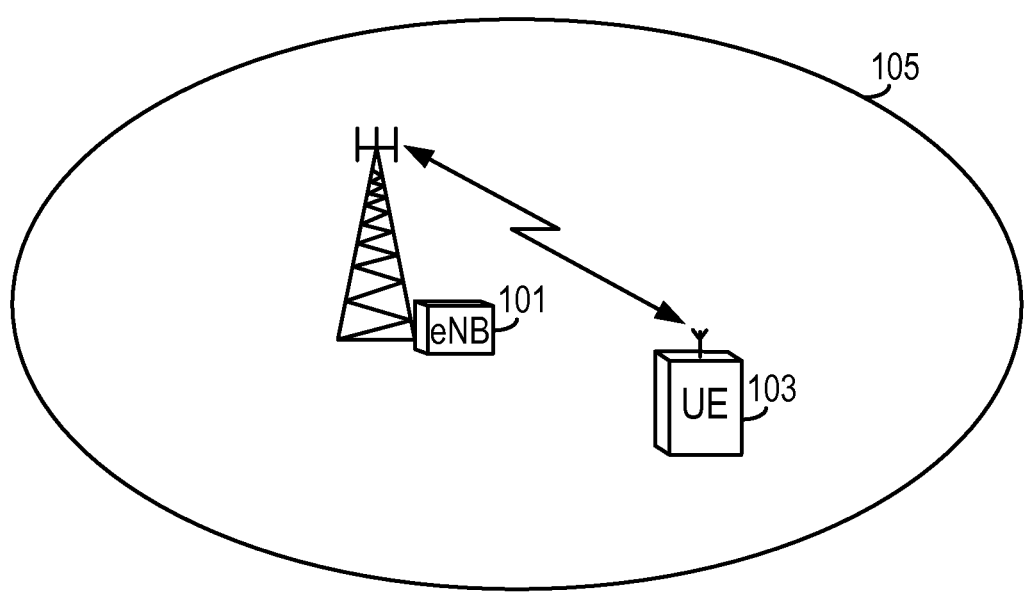
FIG. 1 is a diagram illustrating a serving node, and a UE located within the serving node's geographical area of service.
Figure 2:
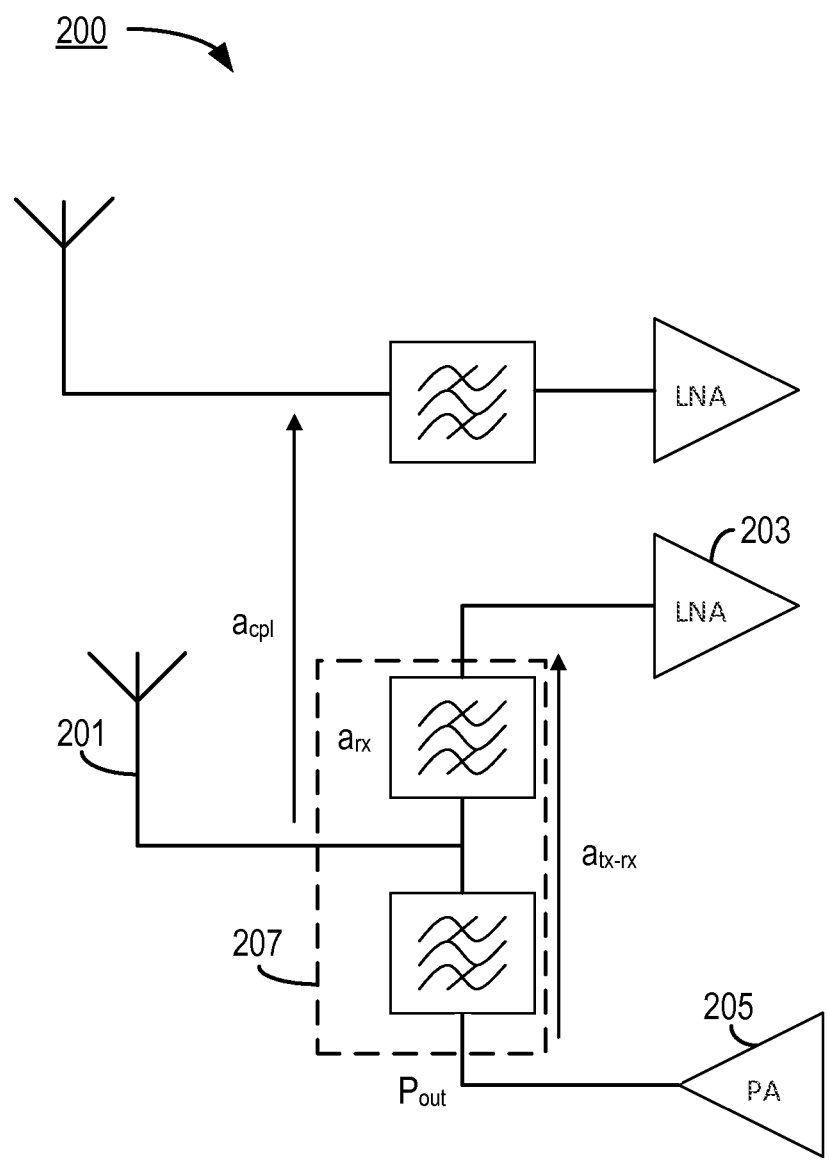
FIG. 2 is a block diagram illustrating aspects of a typical diversity receiver.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a UE selects a most appropriate one of a number of different interference models, each interference model being related to different interference scenarios (e.g., an interference model for use when there are no RF impairments, a different interference model when there is AWGN interference, an interference model having a shape over the receiver's bandwidth that is related to IM2, one or more interference models having a shape over the receiver's bandwidth that is related to IM3 with different assumptions being made about the presence of a half duplex interferer). The selected interference model is then used to scale soft values prior to their decoding.

In another aspect of some embodiments consistent with the invention, selection of a most appropriate one of the different interference models is based on one or more of: allocated uplink bandwidth (e.g., resource blocks in an LTE system), RX signal level, and/or TX signal power level. For example, when the RX signal level is low and the TX signal power level is high, the UE knows that there is a risk of transmitter self-interference and can respond by selecting an interference model having a shape over the receiver's bandwidth that is related to IM2 and/or IM3.

These and other aspects are discussed further in the following. As a convenience to the reader, the following description is presented using terminology from, and in the context of, multi-carrier operation in LTE systems. This helps facilitate the reader's understanding of the various aspects of embodiments consistent with the invention because it eliminates the need to describe aspects of such systems that are already well-known to those of ordinary skill in the art. However, this approach to describing the invention is not intended to limit its application to only LTE systems. To the contrary, those of ordinary skill in the art will readily understand how to apply the various aspects of embodiments consistent with the invention in systems built in accordance with other radio access technologies, or in multi-carrier operation using a combination of different radio access technologies.

Figure 5:
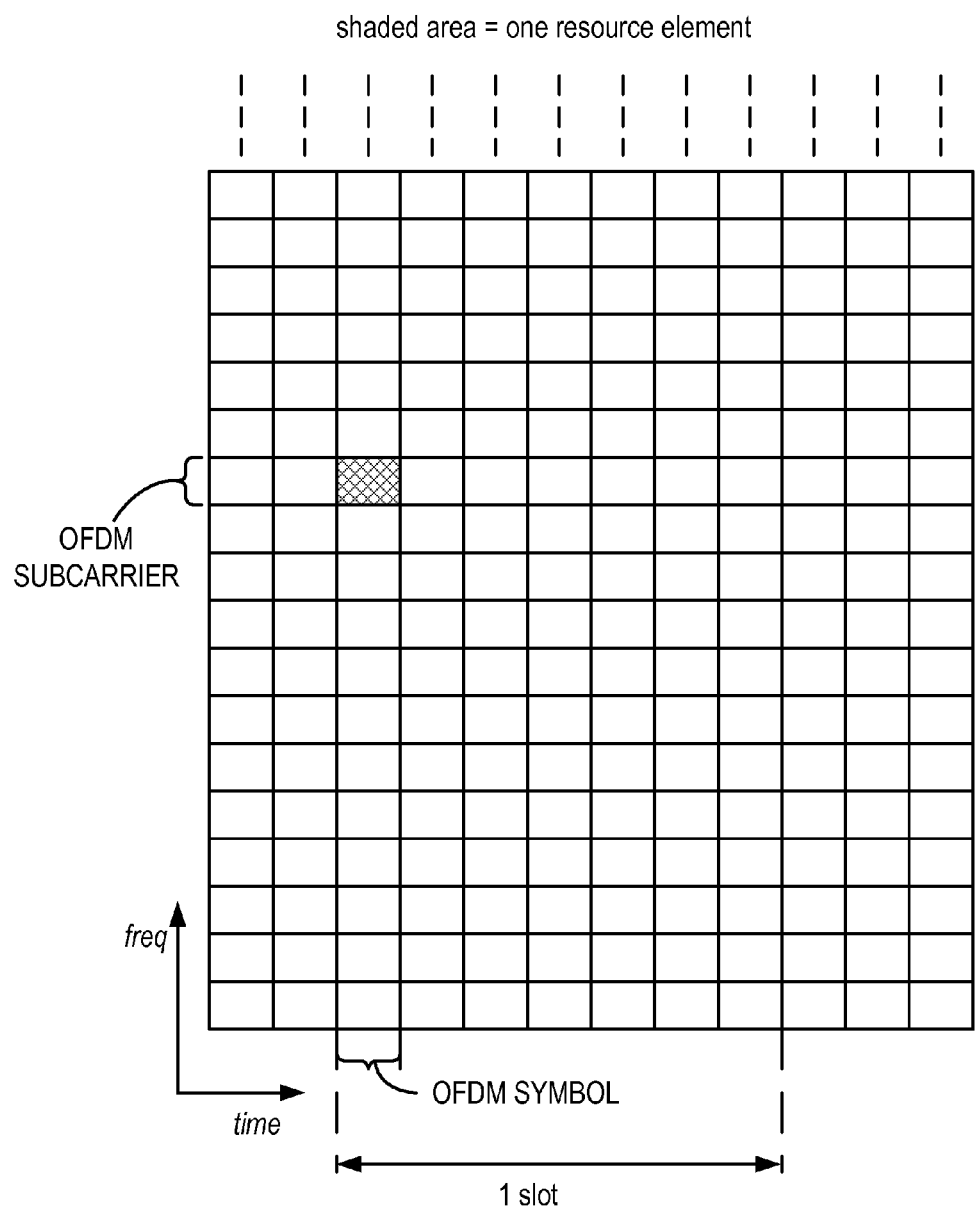
FIG. 5 is a time-frequency grid that illustrates a resource element of an LTE system.

The LTE physical layer transmission is based on Orthogonal Frequency Division Multiplexing (OFDM). The basic LTE physical resource can thus be seen as a time-frequency grid as illustrated in FIG. 5, in which each so-called "resource element" corresponds to one OFDM subcarrier during one OFDM symbol interval.

Figure 6:
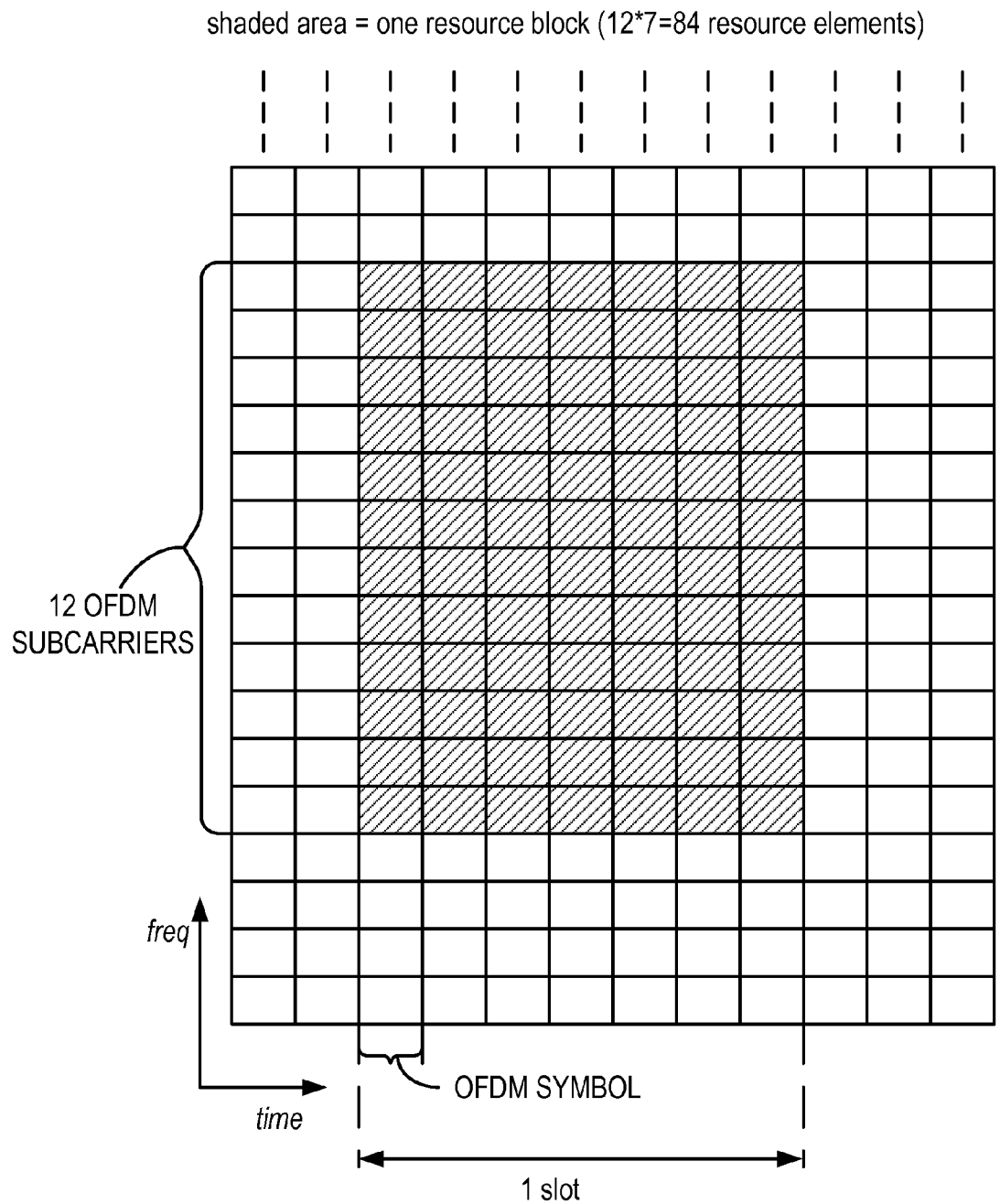
FIG. 6 illustrates how subcarriers in the frequency domain are grouped into resource blocks in an LTE system.

As illustrated in FIG. 6, the downlink subcarriers in the frequency domain are grouped into resource blocks, where each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a carrier to consist of any number of resource blocks, ranging from $N_{RB\text{-}min}=6$ and upwards, corresponding to a nominal transmission bandwidth ranging from around 1 MHz up to well beyond 20 MHz. This allows for a very high degree of LTE bandwidth/spectrum flexibility, at least from a physical-layer-specification point-of-view.

A receiver in an LTE system (as well as in other systems) generates soft values from the received signal, scales them according to the current interference level, and then generates decoded data based on the scaled soft values. The interference level is estimated using symbols from the received OFDM signal that are usable as reference symbols. For example, these may be pilot symbols transmitted from the transmitter expressly for the purpose of being used as reference symbols. Alternatively, the UE may be able to ascertain other aspects of the received OFDM signal that, although not expressly transmitted for use as reference symbols, are nonetheless known to the UE and are therefore usable as reference symbols. In order to obtain reliable interference level estimates, a receiver conventionally always assumes that the interference level is constant over the allocated number of resource blocks. This assumption is especially valid under circumstances of low received signal level, close to the sensitivity level, since in this case the assumption is that the interference is the thermal noise floor.

Figure 3:
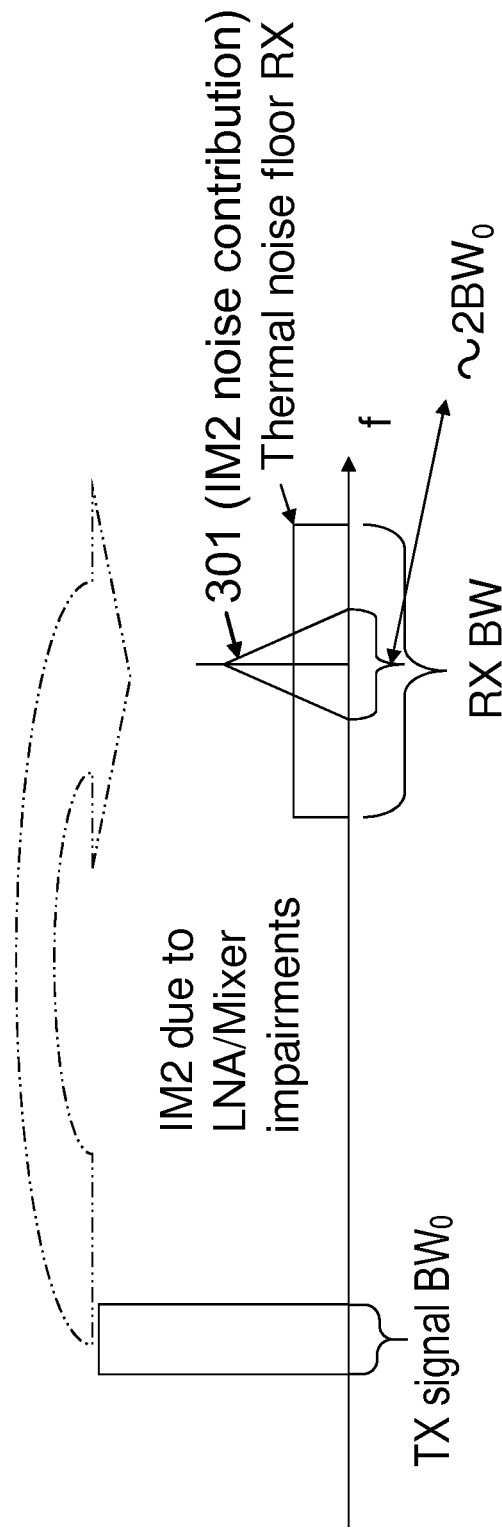
FIG. 3 illustrates an IM2 noise spectrum in a receiver bandwidth related to uplink transmissions.
Figure 4:
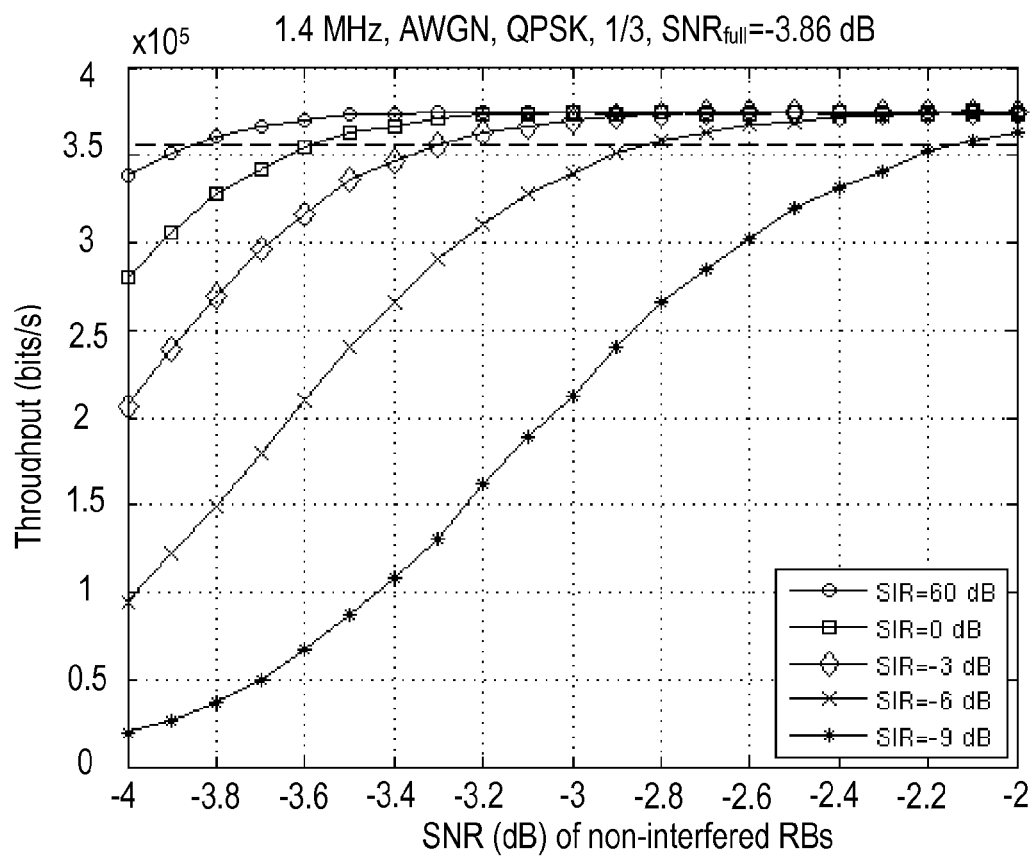
FIG. 4 is a set of graphs illustrating the effect of degrading one third of the allocated sub-carriers of an exemplary system.

However, as discussed above, a flat noise response is not always true in FDD systems such as LTE. For example, as has been illustrated and discussed in connection with FIG. 3, IM2 interference is also possible. The inventors have recognized that, when transmission-related interference is possible (i.e., when transmission and reception are occurring simultaneously in the UE at levels likely to produce interference in the receiver band), a more suitable (e.g., non-uniform) interference model can be applied to improve reception of the OFDM signal, as will be described further below. For example, when IM2 interference is possible, the number of allocated resource blocks in the uplink transmission will determine which resources blocks within the receiver bandwidth are affected.

Figure 7:
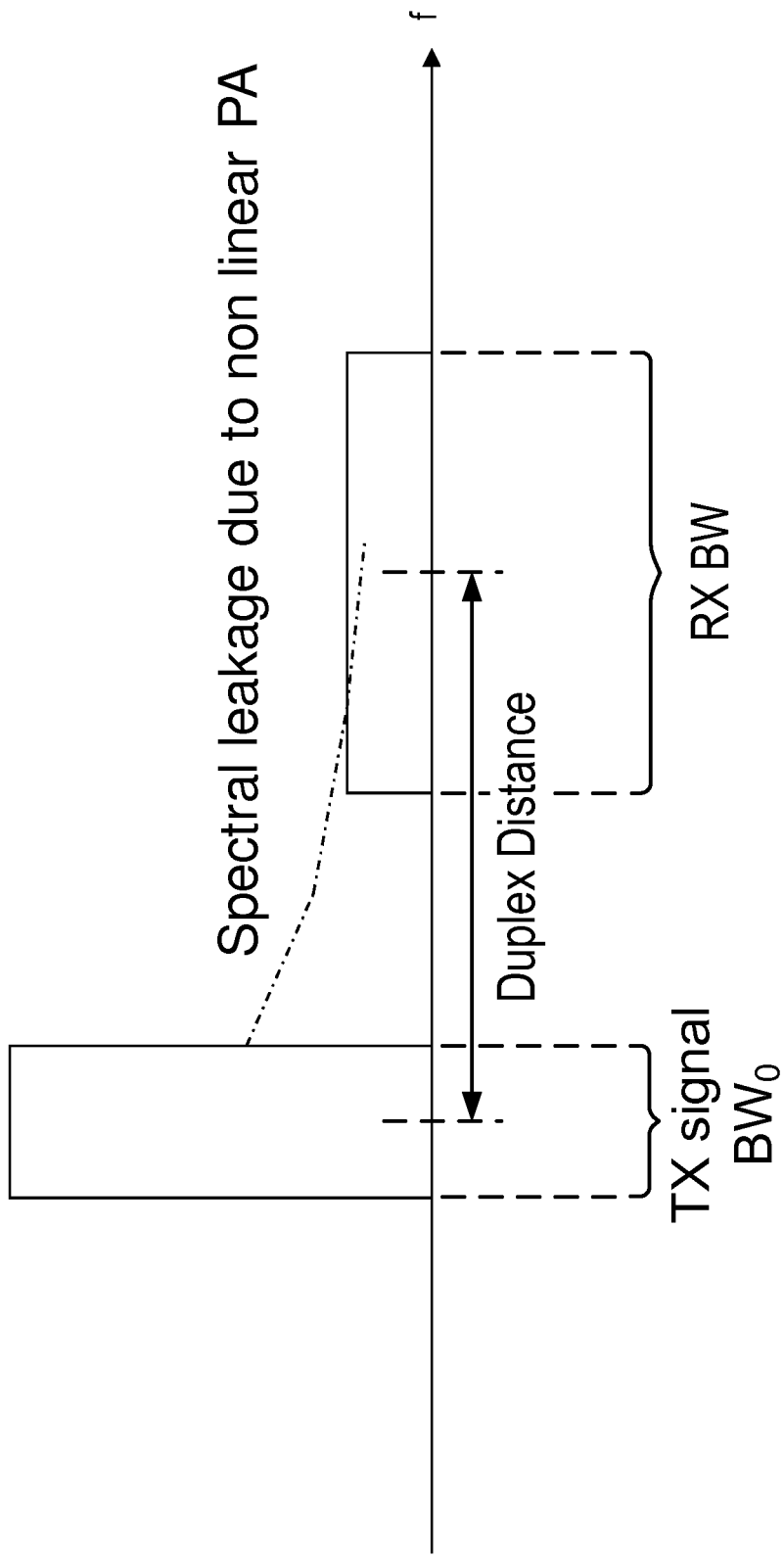
FIG. 7 is a graph illustrating signal spectrum leakage of a transmitted signal into a receive band due to small duplex suppression when the transmitted signal is at high power and the transmitter's power amplifier exhibits non-linear characteristics.

Another possible transmission-related impairment can occur if duplex suppression of the transmitted signal is small due, for example, to the duplex distance being small in some frequency bands (e.g., in the 700 MHz bands). Then, at high power, due to non-linear characteristics of the transmitter's power amplifier, the transmitted signal spectrum can leak into the receiver band. This is illustrated in FIG. 7. Since the leakage is proportional to the allocated uplink resource blocks and the power amplifier characteristics (which are known when the UE's controller is designed), the UE can determine whether there is a risk that some resource blocks (typically the ones that are close to the transmitter's carrier frequency) may be affected by the transmitter's spectral leakage and therefore the interference model related to this case could also be applied.

Figure 8:
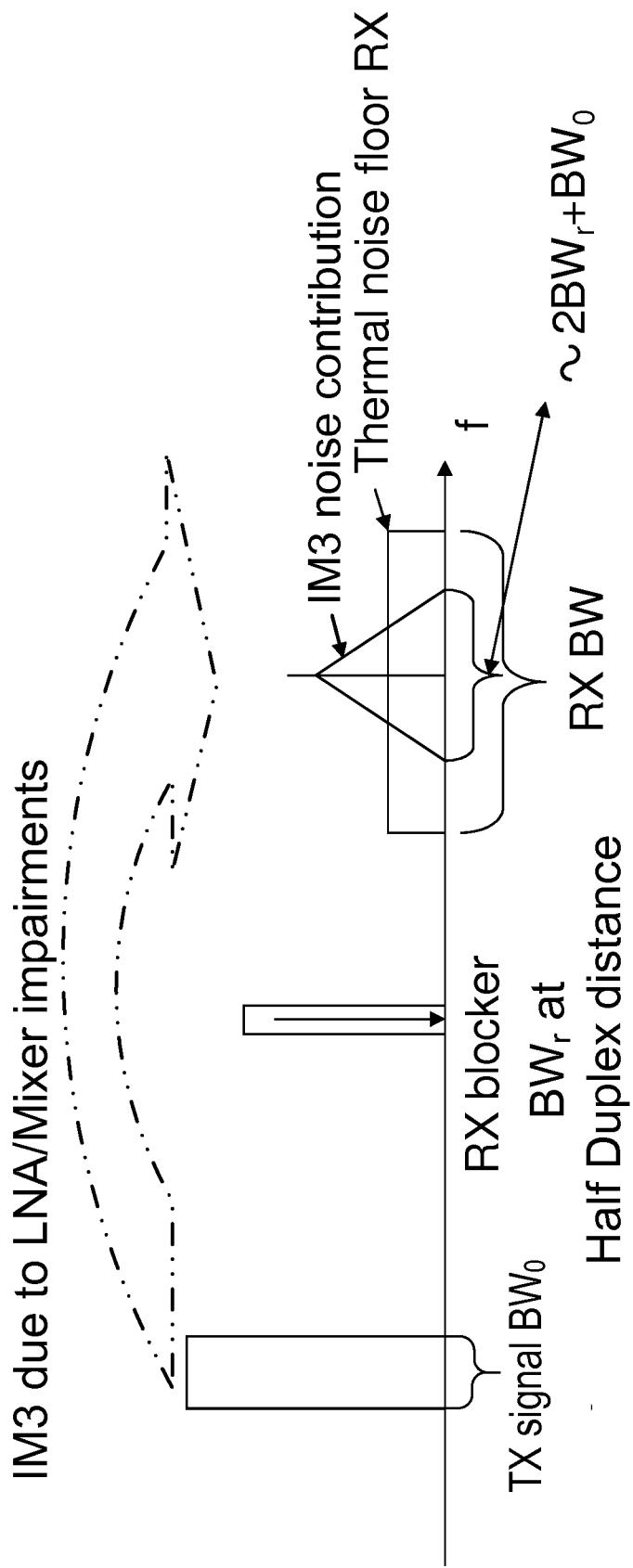
FIG. 8 is a graph illustrating a received signal being affected by third-order intercept point (IP3) products.

FIG. 8 shows yet another case when the received signal is affected by transmission-related impairments, this time in the form of IM3 products. In this case, the interference shape over the receiver bandwidth is related to the uplink resource block allocation and the bandwidth of the half duplex interferer. The interference has a bandwidth that is approximately twice the bandwidth of the half duplex interferer plus the bandwidth of the uplink transmission. In a typical case, the knowledge of the half duplex interferer is not exactly known by the UE. However, a list of likely interferer bandwidths can be compiled for each carrier frequency that the UE will use, and this list can be stored within the UE in a lookup table. For example, if the half duplex interferer is within the LTE downlink band it could have a bandwidth between 1.4-20 MHz. The lookup table is accessed by a UE controller, as is described further below, and various hypotheses and tests are performed to determine a best interference model to be applied under existing reception conditions.

Figure 9A:
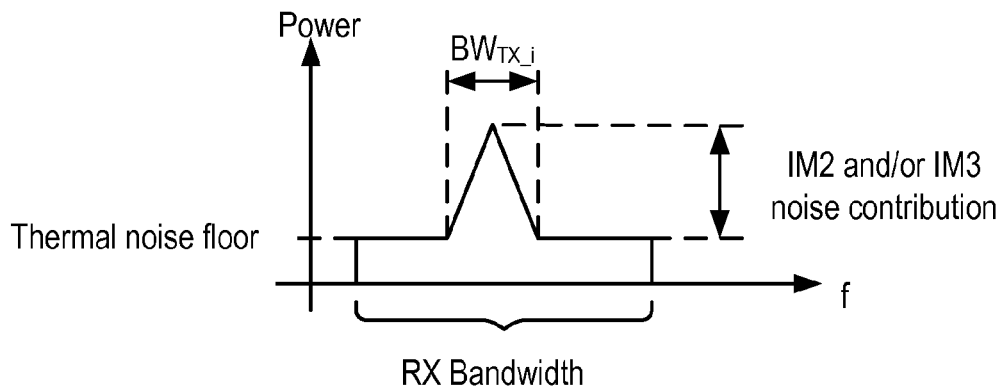
FIGS. 9a, 9b, and 9c illustrate several of many possible different interference models that can be applied for soft-value scaling.
Figure 9B:
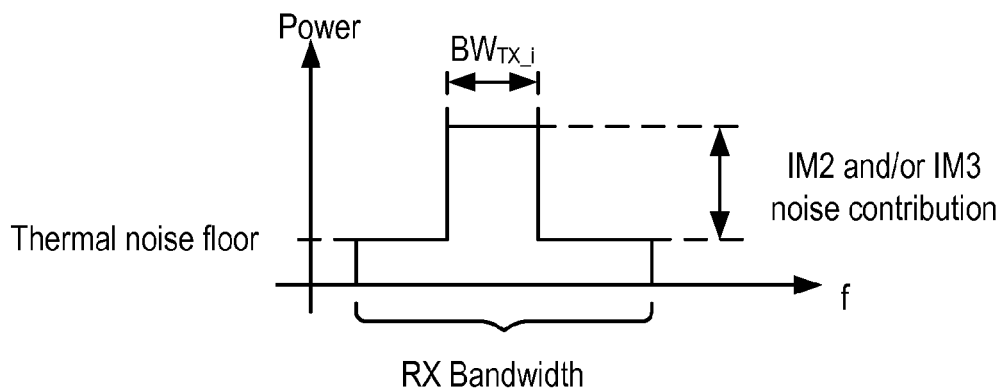
Figure 9C:
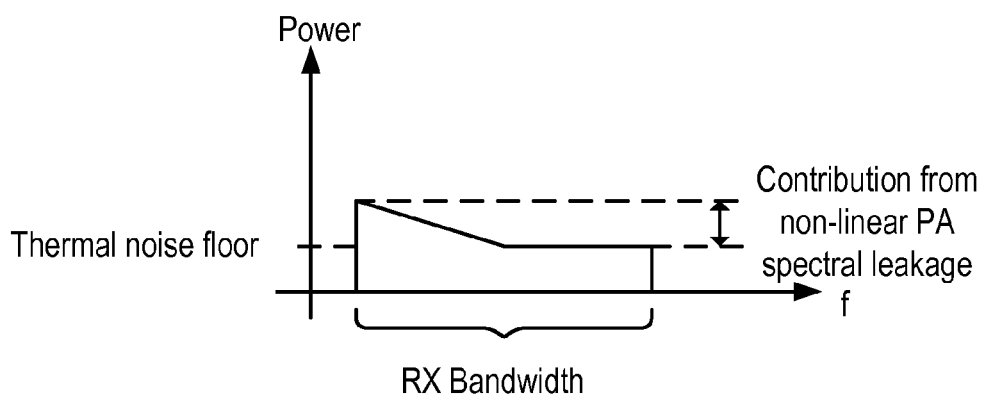

FIGS. 9a, 9b, and 9c illustrate several of many possible different interference models that can be applied for soft-value scaling. FIG. 9a illustrates a model shape that is useful when the UE ascertains that IM2 and/or IM3 interference is present. The bandwidth $BW_{TX\_i}$ is related to the bandwidth of the uplink transmission and (in the case of IM3) also the bandwidth of a half duplex interferer.

FIG. 9b illustrates another model shape that is useful when the UE ascertains that IM2 and/or IM3 interference is present. Again the bandwidth $BW_{TX\_i}$ is related to the bandwidth of the uplink transmission and (in the case of IM3) also the bandwidth of a half duplex interferer. The model of FIG. 9b, while not being as precise as that of FIG. 9a, requires less computational complexity in working embodiments.

FIG. 9c illustrates a model shape that is useful when the UE ascertains that, due to non-linearities in the transmitter's power amplifier, spectral leakage from the uplink transmission is present. It will be observed that in this model, the level of interference increases the closer the receiver's resource block is to the transmitted signal.

Figure 10:
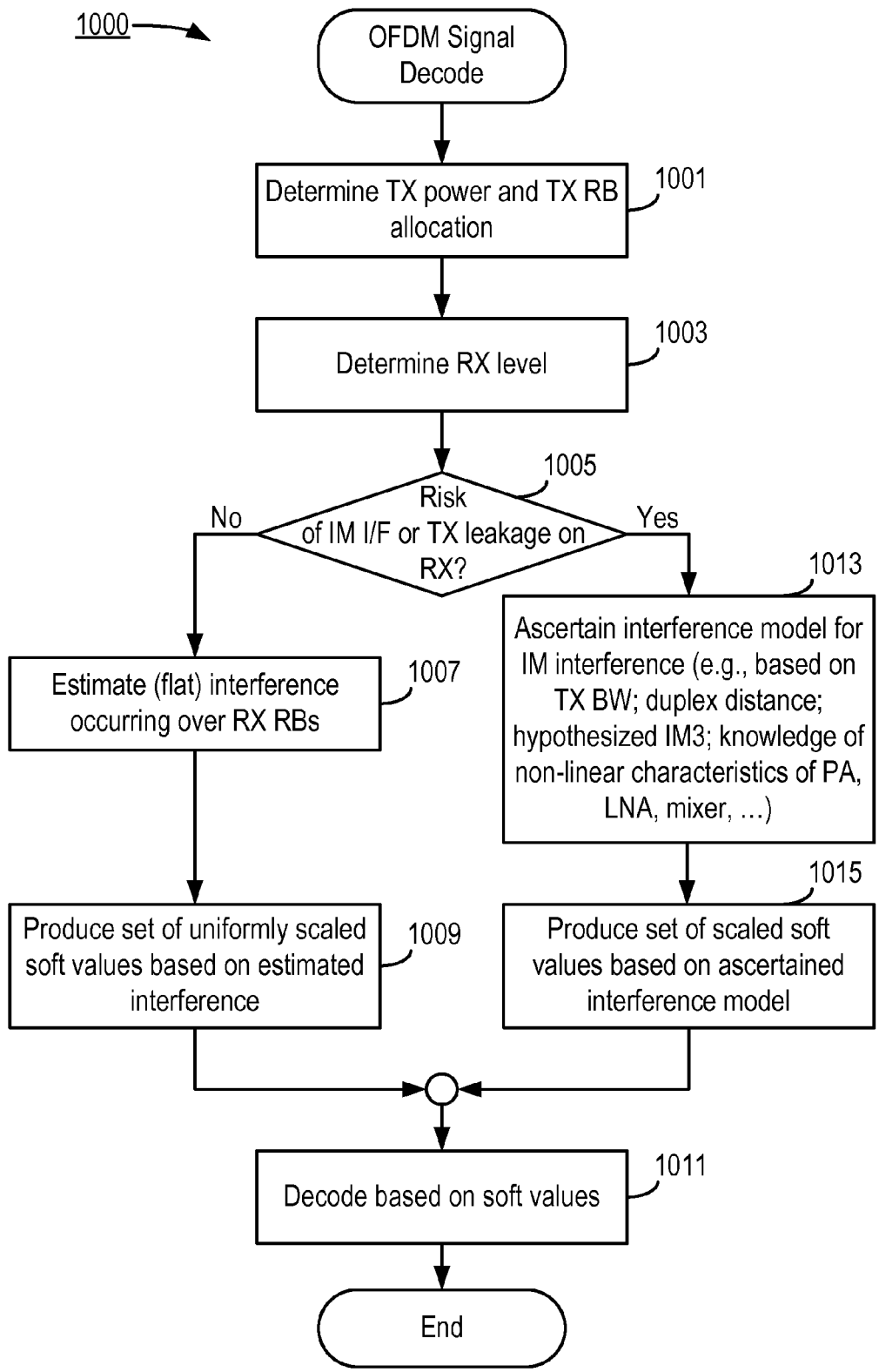
FIG. 10 is, in one respect, a flowchart of an exemplary process/steps performed by UE circuitry in accordance with embodiments that are consistent with the invention.

FIG. 10 is, in one respect, a flowchart of an exemplary process/steps performed by UE circuitry in accordance with embodiments that are consistent with the invention. In another respect, FIG. 10 can be considered to depict a UE 1000 comprising variously depicted circuitry/means and their interrelationship for performing the described functions. A control unit in the UE 1000 determines the transmission power level the transmission resource block allocation (step 1001). The control unit also determines the received signal power level (step 1003). The control unit then determines whether there is a risk for transmitter self-interference, due to receiver or transmitter nonlinearities (e.g., transmitter leakage on the receiver), or in general any IM interference (decision block 1005). This is typically the case if the transmission power level is above 20 dBm and the received signal power level is below −90 dBm, but the exact values will depend on the which frequency band is being used and which uplink resource blocks have been allocated.

If there is no risk for transmitter self-interference ("No" path out of decision block 1005), the interference level is assumed to be flat over all of the allocated receiver resource blocks, and is estimated according to any known technique (step 1007). This estimated interference is used to scale the soft values uniformly (step 1009) and the received signal is decoded based on the scaled soft values (step 1011).

Soft values can be generated in any of a number of known ways. One could, for example, use the known optimal log-MAP principle, but this requires a high level of implementation complexity. This is typically avoided by using a max-log-MAP approximation for demodulation, in which a soft value L to be passed to a decoder is derived in accordance with $$L = \frac{1}{\sigma^2}\left\{\min_{s:b_i(s)=+1}|y-hs|^2 - \min_{s:b_i(s)=-1}|y-hs|^2\right\}$$

where
$\sigma^2$ is the estimated interference,
y is the received channel symbol,
h is the estimated channel for this symbol,
s is the undisturbed constellation, and
$b_i(s)$ denotes the bit at position i of all constellation points.

Returning now to a consideration of decision block 1005, if there is a risk of transmitter self-interference ("Yes" path out of decision block 1005), the control unit ascertains which of the possible interference models best corresponds to present circumstances (step 1013). This can be based on any of a number of factors, such as but not limited to: the bandwidth of the transmitted signal (e.g., number of allocated TX resource blocks); the duplex distance; hypothesized half-duplex blockers (which translates into hypothesized IM3 interference); knowledge of non-linear characteristics of the transmitter's power amplifier; knowledge of non-linear characteristics of the receiver's low noise amplifier; and knowledge of non-linear characteristics of the receiver's mixer. For example, as explained above with respect to IM2 interference, the bandwidth of the transmitted signal will determine the bandwidth $BW_{TX}$ illustrated in FIGS. 9a and 9b; this in turn determines the shape of the interference model.

Since the Bandwidth for the (potential) half-duplex blocker might not be known, different bandwidth hypotheses can be applied, such as but not limited to a fixed LTE bandwidth, or a carrier wave/GSM signal bandwidth. Then the best one of these hypothesized interference models is determined. This can for instance be done by first determining the channel estimate using reference symbols (or other symbols that are usable as reference symbols), and then from the filtered channel estimate determining the best interference model/shape that fits the residuals. This can be made using standard model validation techniques.

Once the best interference model is determined, the interference values for respective sub-carriers are interpolated, and soft value scaling on respective sub-carriers is made according to the detected interference model/interference shape (step 1015). Once the scaled soft values are generated, decoding is performed based on these scaled soft values (step 1011).

Figure 11:
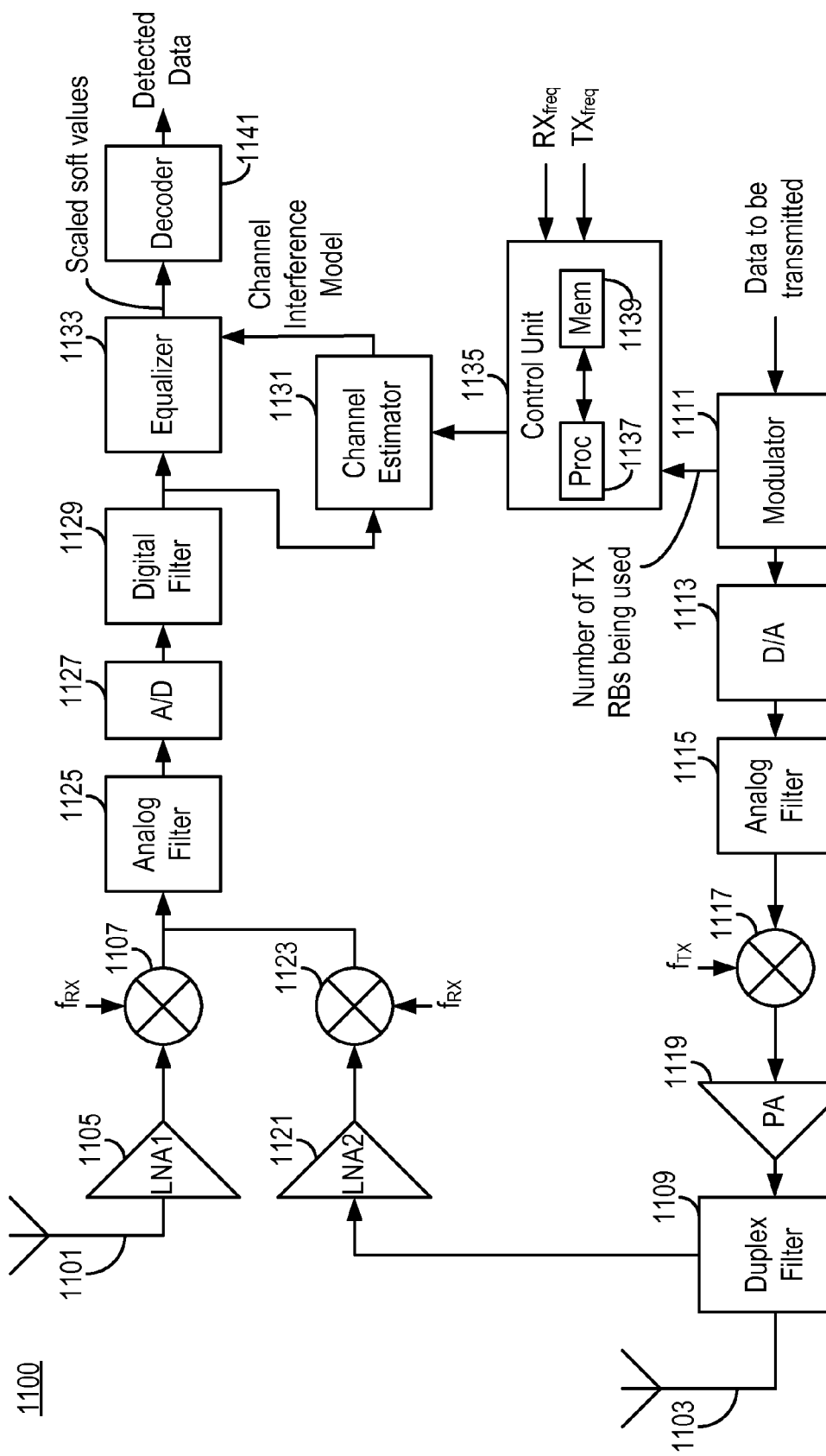
FIG. 11 is a block diagram of an exemplary UE configured to carry out aspects of the invention.

FIG. 11 is a block diagram of an exemplary UE 1100 configured to carry out aspects of the invention. To facilitate the reader's understanding of the various aspects, only those components that are at least fairly related to one or more aspects of embodiments consistent with the invention are shown and described. Those of ordinary skill in the art will readily understand, however, that a typical UE includes many other components (e.g., user input/output components, higher layer software and processing capability) that are not shown or described.

The exemplary UE 1100 includes respective first and second antennas 1101 and 1103. The first antenna 1101 is dedicated for use in a first receiver chain, and feeds its signal to a first low noise amplifier 1105. The output of the first low noise amplifier 1105 is supplied to a first mixer 1107. Another input of the first mixer 1107 receives a signal oscillating at the receiver's carrier frequency, $f_{RX}$, so that the first mixer 1107 effectively downconverts the radiofrequency signal supplied by the first low noise amplifier 1105 into a baseband signal.

The use of the second antenna 1103 is shared between a second receiver chain and a transmitter chain. Sharing is achieved by means of a duplex filter 1109. With respect to the transmitter chain, data to be transmitted is supplied to a modulator 1111, which modulates the data onto the allocated uplink resource blocks. (In an LTE system, the UE receives, in subframe N, information about where and how many transmitter resource blocks it is allowed to transmit on in upcoming subframe N+4; i.e., 4 ms later. This information is sent on a control channel.) The modulated data is supplied to a digital-to-analog (D/A) converter 1113 which supplies a modulated analog signal at its output. The modulated analog signal is then filtered by an analog filter 1115 to ensure that the analog signal contains frequency components only within a desired transmit band.

The filtered analog signal is then supplied to one input of a second mixer 1117. Another input of the second mixer 1117 is a signal oscillating at the carrier frequency, $f_{TX}$, so that the filtered analog signal is upconverted to the carrier frequency. The modulated radiofrequency signal is supplied to a power amplifier 1119, which boosts the power of the modulated radiofrequency signal so that it can be broadcast from the second antenna 1103 via the duplex filter 1109.

With respect to the receiver, the second antenna 1103 feeds its signal to a second low noise amplifier 1121. The output of the second low noise amplifier 1121 is supplied to a third mixer 1123. Another input of the third mixer 1123 receives a signal oscillating at the receiver's carrier frequency, $f_{RX}$, so that the third mixer 1123 effectively downconverts the radiofrequency signal supplied by the second low noise amplifier 1121 into a baseband signal.

The analog received baseband signals generated at the outputs of the first and third mixers 1107, 1123 are supplied to an analog filter 1125 which ensures that only desired frequency components are present prior to conversion to digital form (e.g., the analog filter 1125 suppresses blockers and provides anti-aliasing functions). The filtered baseband signal is then supplied by the analog filter 1125 to an analog-to-digital (A/D) converter 1127 which generates a digital baseband signal. The digital baseband signal is supplied to a digital filter 1129 for further filtering (e.g., to perform close-in selectivity filtering).

The filtered baseband signal is supplied to a channel estimator 1131 and to an equalizer 1133. The channel estimator is controlled by a control unit 1135 that generates control signals that are distributed to the channel estimator 1131 and other UE circuitry (not shown) to carry out aspects of the invention, such as those illustrated in, and described with respect to, FIG. 10. As one non-limiting example, the control unit 1135 can be implemented as a programmable processor 1137 coupled to a computer readable storage medium (e.g., memory) 1139 having stored therein a set of program instructions which, when executed by the processor 1137, cause the processor to perform steps that result in the generation of the control signals to carry out the various aspects of the invention as described herein. The control unit 1135 may include other circuitry (not shown) in addition to or in place of the processor 1137 and computer readable storage medium 1139, and such alternative embodiments are easily derivable by those of ordinary skill in the art based on the descriptions provided herein.

The control unit 1135 receives information indicating, for example, the receiver's carrier frequency, the transmitter's carrier frequency, and (e.g., from the modulator or similar) the bandwidth of the transmitted signal (e.g., in an LTE system, the number of transmitter resource blocks, which could be lower than the total transmitter bandwidth). Using this information and techniques such those described above with respect to FIG. 10, the control unit 1135 generates control signals that cause the channel estimator 1131 to ascertain an interference model that represents interference occurring in the receiver's subcarriers, wherein the interference includes interference caused by a transmitted OFDM signal that occupies a transmitter's subcarriers. As described above, this interference model need not, and in many cases will not be, uniform across the receiver's receive band.

The channel estimator 1131 supplies the ascertained channel interference model to the equalizer 1133 which generates scaled soft values from the filtered baseband signal and the ascertained channel interference model. The scaled soft values are then supplied to a decoder 1141, which generates detected data based on the scaled soft values using known detection techniques.

Figure 12:
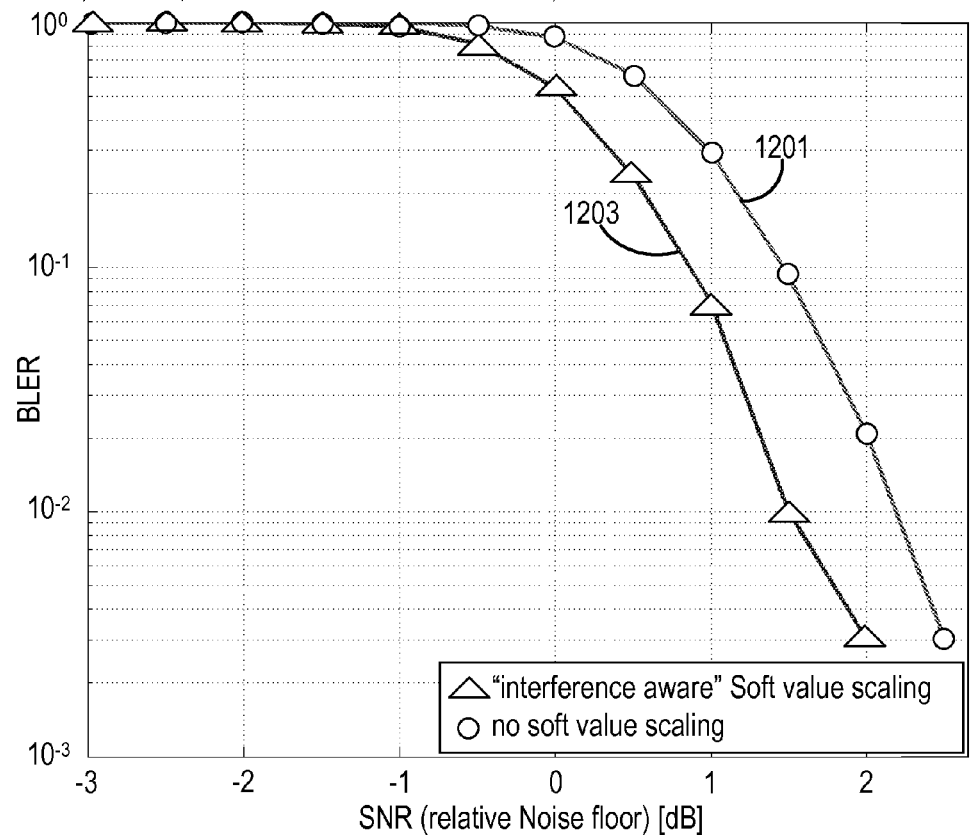
FIG. 12 is a graph illustrating exemplary effects on block error rate (BLER) when non-uniform interference model scaling is applied as described herein.

FIG. 12 is a graph illustrating exemplary effects on block error rate (BLER) when non-uniform interference model scaling is applied as described herein. In this example, it is assumed that one third (⅓) of the coded bits in the receive band are affected by an additional IM2 level equal to the thermal noise floor. The graph 1201 shows the BLER without the scaling, and the graph 1203 shows the BLER with scaling. The benefits of scaling are clearly visible, since for a given SNR, the BLER with scaling is lower than the BLER without scaling.

In other aspects, it is noted that the various inventive aspects described above are not restricted to having the same interference mode for each receiver. For example, in the embodiment depicted in FIG. 11, one of the receivers is coupled to the transmitter chain by means of a duplex filter, whereas another receiver chain does not have this coupling. In such situations, two different interference models may be applied to the respective two different receiver chains.

By adapting interference scaling to a currently-experienced interference scenario (i.e., dynamic adaptation), receiver performance is improved compared to conventional techniques.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of decoding a received Orthogonal Frequency Division Multiplex (OFDM) signal that occupies a first set of subcarriers in a radio frequency spectrum, the method comprising: ascertaining an interference model that represents interference occurring in the first set of subcarriers caused by a transmitted OFDM signal that occupies a second set of subcarriers in the radio frequency spectrum; producing a set of scaled soft values that represents information conveyed by the received OFDM signal over the first set of subcarriers, wherein each scaled soft value in the set of scaled soft values corresponds to a respective one of the subcarriers in the first set of subcarriers, and wherein a scaling amount applied to each of the scaled soft values is based on a corresponding level of interference in said respective one of the subcarriers as indicated by the interference model; and performing a decoding process that generates detected data from the scaled soft values; wherein the received OFDM signal and the transmitted OFDM signal are separated from one another by a duplex distance in the radio frequency spectrum, and wherein the method comprises: for each of a set of one or more hypothesized signals being transmitted in the radio frequency spectrum at a location that is substantially one half the duplex distance away from the received OFDM signal, wherein each of the hypothesized signals, when mixed with the transmitted OFDM signal that occupies the second set of subcarriers, gives rise to third order intermodulation products (IM3) located within one or more of the first set of subcarriers, ascertaining a hypothesized interference model that would apply to the first set of subcarriers; and ascertaining which one of the hypothesized interference models most closely matches measured results, and using the ascertained one of the hypothesized interference models to at least in part determine a level of scaling applied to each of the soft values.

2. The method of claim 1, wherein ascertaining the interference model comprises:
  determining a reception power level of the received OFDM signal; and
  determining a transmission power level of the transmitted OFDM signal,
  and wherein the interference model applies non-uniform scaling if the reception power level of the received OFDM signal is below a first threshold value and the transmission power level of the transmitted OFDM signal is above a second threshold value.

3. The method of claim 2, wherein the interference model applies uniform scaling if the reception power level of the received OFDM signal is not below the first threshold value and/or the transmission power level of the transmitted OFDM signal is not above the second threshold value.

4. The method of claim 1, wherein ascertaining the interference model comprises:
  ascertaining a bandwidth of the second set of subcarriers; and
  ascertaining the interference model at least in part as a function of the ascertained bandwidth of the second set of subcarriers.

5. The method of claim 4, wherein the interference model specifies non-minimal interference levels occurring on those subcarriers within the first set of subcarriers that are no farther than the ascertained bandwidth's distance from a center subcarrier of the first set of subcarriers, and the interference model specifies minimal interference levels occurring on those subcarriers within the first set of subcarriers that are farther than the ascertained bandwidth's distance from the center subcarrier of the first set of subcarriers.

6. The method of claim 5, wherein the interference model specifies a maximum interference level occurring at the center subcarrier of the first set of subcarriers and diminishing levels of interference occurring in correspondence with distance from the center subcarrier of the first set of subcarriers.

7. The method of claim 1, wherein ascertaining the interference model comprises:
  ascertaining the interference model at least in part as a function of a duplex distance between the first set of subcarriers and the second set of subcarriers.

8. The method of claim 1, wherein ascertaining the hypothesized interference model that would apply to the first set of subcarriers comprises retrieving the hypothesized interference model from a lookup table.

9. The method of claim 1, wherein ascertaining which one of the hypothesized interference models most closely matches measured results comprises: obtaining symbols from the received OFDM signal that are usable as reference symbols; using the obtained symbols that are usable as reference symbols in a channel estimation procedure that generates residual values; using the residual values to obtain a validation results for each of the hypothesized interference models; and ascertaining which one of the hypothesized interference models is associated with a highest level of validation.

10. The method of claim 1, wherein the received OFDM signal and the transmitted OFDM signal are separated from one another by a duplex distance in the radio frequency spectrum, and wherein ascertaining the interference model comprises:
  ascertaining the interference model at least in part as a function of the duplex distance and of non-linear characteristics of a power amplifier that supplies the transmitted OFDM signal.

11. The method of claim 1, wherein the received OFDM signal and the transmitted OFDM signal are separated from one another by a duplex distance in the radio frequency spectrum, and wherein ascertaining the interference model comprises:
  ascertaining the interference model at least in part as a function of the duplex distance and of non-linear characteristics of a low noise amplifier and or mixer in a receiver that receives the received OFDM signal.

12. An apparatus for decoding a received Orthogonal Frequency Division Multiplex (OFDM) signal that occupies a first set of subcarriers in a radio frequency spectrum, the apparatus comprising: circuitry configured to ascertain an interference model that represents interference occurring in the first set of subcarriers caused by a transmitted OFDM signal that occupies a second set of subcarriers in the radio frequency spectrum; circuitry configured to produce a set of scaled soft values that represents information conveyed by the received OFDM signal over the first set of subcarriers, wherein each scaled soft value in the set of scaled soft values corresponds to a respective one of the subcarriers in the first set of subcarriers, and wherein a scaling amount applied to each of the scaled soft values is based on a corresponding level of interference in said respective one of the subcarriers as indicated by the interference model; and circuitry configured to perform a decoding process that generates detected data from the scaled soft values; wherein the received OFDM signal and the transmitted OFDM signal are separated from one another by a duplex distance in the radio frequency spectrum, and wherein the apparatus comprises: circuitry configured to ascertain a hypothesized interference model that would apply to the first set of subcarriers for each of a set of one or more hypothesized signals being transmitted in the radio frequency spectrum at a location that is substantially one half the duplex distance away from the received OFDM signal, wherein each of the hypothesized signals, when mixed with the transmitted OFDM signal that occupies the second set of subcarriers, gives rise to third order intermodulation products (IM3) located within one or more of the first set of subcarriers; and circuitry configured to ascertain which one of the hypothesized interference models most closely matches measured results, and to use the ascertained one of the hypothesized interference models to at least in part determine a level of scaling applied to each of the soft values.

13. The apparatus of claim 12, wherein the circuitry configured to ascertain the interference model comprises:

circuitry configured to determine a reception power level of the received OFDM signal; and circuitry configured to determine a transmission power level of the transmitted OFDM signal;

and wherein the circuitry configured to ascertain the interference model that represents interference occurring in the first set of subcarriers caused by the transmitted OFDM signal that occupies the second set of subcarriers in the radio frequency spectrum is configured to apply an interference model having non-uniform scaling if the reception power level of the received OFDM signal is below a first threshold value and the transmission power level of the transmitted OFDM signal is above a second threshold value.

14. The apparatus of claim 13, wherein the circuitry configured to ascertain the interference model that represents interference occurring in the first set of subcarriers caused by the transmitted OFDM signal that occupies the second set of subcarriers in the radio frequency spectrum is configured to apply an interference model having a uniform scaling if the reception power level of the received OFDM signal is not below the first threshold value and/or the transmission power level of the transmitted OFDM signal is not above the second threshold value.

15. The apparatus of claim 12, wherein the circuitry configured to ascertain the interference model comprises:

circuitry configured to ascertain a bandwidth of the second set of subcarriers; and circuitry configured to ascertain the interference model at least in part as a function of the ascertained bandwidth of the second set of subcarriers.

16. The apparatus of claim 15, wherein the interference model specifies non-minimal interference levels occurring on those subcarriers within the first set of subcarriers that are no farther than the ascertained bandwidth's distance from a center subcarrier of the first set of subcarriers, and the interference model specifies minimal interference levels occurring on those subcarriers within the first set of subcarriers that are farther than the ascertained bandwidth's distance from the center subcarrier of the first set of subcarriers.

17. The apparatus of claim 16, wherein the interference model specifies a maximum interference level occurring at the center subcarrier of the first set of subcarriers and diminishing levels of interference occurring in correspondence with distance from the center subcarrier of the first set of subcarriers.

18. The apparatus of claim 12, wherein the circuitry configured to ascertain the interference model comprises:

circuitry configured to ascertain the interference model at least in part as a function of a duplex distance between the first set of subcarriers and the second set of subcarriers.

19. The apparatus of claim 12, wherein the circuitry configured to ascertain the hypothesized interference model that would apply to the first set of subcarriers comprises circuitry configured to retrieve the hypothesized interference model from a lookup table.

20. The apparatus of claim 12, wherein the circuitry configured to ascertain which one of the hypothesized interference models most closely matches measured results comprises: circuitry configured to obtain symbols from the received OFDM signal that are usable as reference symbols; circuitry configured to use the obtained symbols that are usable as reference symbols in a channel estimation procedure that generates residual values; circuitry configured to use the residual values to obtain a validation results for each of the hypothesized interference models; and circuitry configured to ascertain which one of the hypothesized interference models is associated with a highest level of validation.

21. The apparatus of claim 12, wherein the received OFDM signal and the transmitted OFDM signal are separated from one another by a duplex distance in the radio frequency spectrum, and wherein the circuitry configured to ascertain the interference model comprises:

circuitry configured to ascertain the interference model at least in part as a function of the duplex distance and of non-linear characteristics of a power amplifier that supplies the transmitted OFDM signal.

22. The apparatus of claim 12, wherein the received OFDM signal and the transmitted OFDM signal are separated from one another by a duplex distance in the radio frequency spectrum, and wherein the circuitry configured to ascertain the interference model comprises:

circuitry configured to ascertain the interference model at least in part as a function of the duplex distance and of non-linear characteristics of a low noise amplifier and or mixer in a receiver that receives the received OFDM signal.

* * * * *